(12) United States Patent
Fieldman

(10) Patent No.: US 11,531,448 B1
(45) Date of Patent: Dec. 20, 2022

(54) HAND CONTROL INTERFACES AND METHODS IN VIRTUAL REALITY ENVIRONMENTS

(71) Applicant: VR-EDU, Inc., Gainesville, FL (US)

(72) Inventor: Ethan Fieldman, Gainesville, FL (US)

(73) Assignee: VR-EDU, INC., Gainesville, FL (US)

( * ) Notice: Subject to any disclaimer, the term of this patent is extended or adjusted under 35 U.S.C. 154(b) by 0 days.

(21) Appl. No.: 17/830,109

(22) Filed: Jun. 1, 2022

(51) Int. Cl.
*G06F 3/0482* (2013.01)
*G06F 3/04815* (2022.01)
*G06F 3/0485* (2022.01)

(52) U.S. Cl.
CPC .......... *G06F 3/0482* (2013.01); *G06F 3/0485* (2013.01); *G06F 3/04815* (2013.01)

(58) Field of Classification Search
CPC ................................................. G06F 3/048–05
See application file for complete search history.

(56) References Cited

U.S. PATENT DOCUMENTS

| | | | | |
|---|---|---|---|---|
| 6,337,694 B1* | 1/2002 | Becker | ............... | G06F 3/04855 715/785 |
| 6,346,929 B1* | 2/2002 | Fukushima | ............. | G06F 3/017 345/9 |
| 7,702,728 B2* | 4/2010 | Zaner | ..................... | H04L 51/58 709/205 |
| 10,943,395 B1* | 3/2021 | Green | ................. | G06F 3/04847 |
| 11,086,392 B1* | 8/2021 | Sztuk | .................... | G06F 3/1423 |
| 11,086,406 B1* | 8/2021 | Ravasz | ................. | G06F 1/1686 |
| 2010/0211638 A1* | 8/2010 | Rougier | ................... | G06F 8/30 717/148 |
| 2012/0047465 A1* | 2/2012 | Noda | ..................... | G06F 3/0346 715/848 |
| 2013/0054319 A1* | 2/2013 | Woods | ............... | G06F 3/04815 715/848 |
| 2014/0009407 A1* | 1/2014 | Kim | ..................... | G06F 3/04817 345/173 |
| 2014/0337749 A1* | 11/2014 | Phang | ................ | H04N 21/4886 715/740 |
| 2016/0004300 A1* | 1/2016 | Baic | ...................... | G06F 3/0346 345/419 |
| 2016/0328884 A1* | 11/2016 | Schowengerdt | ..... | H04N 5/2258 |
| 2017/0336882 A1* | 11/2017 | Tome | ................. | G06F 3/03547 |
| 2018/0040161 A1* | 2/2018 | Tierney | ................. | H04L 67/535 |
| 2018/0062691 A1* | 3/2018 | Barnett, Jr. | ............. | G06F 3/167 |
| 2018/0158053 A1* | 6/2018 | Adams | ............... | G06F 3/04886 |
| 2018/0246698 A1* | 8/2018 | Huang | .................... | H04R 1/32 |
| 2019/0130531 A1* | 5/2019 | Azeyanagi | .......... | G06F 3/04817 |
| 2019/0146578 A1* | 5/2019 | Ikuta | ................... | G06F 3/04815 345/8 |
| 2019/0384460 A1* | 12/2019 | Harnisch | ................. | G06F 9/453 |
| 2020/0133453 A1* | 4/2020 | Walker | .................... | G06F 9/542 |
| 2020/0226814 A1* | 7/2020 | Tang | .................. | G06F 3/0304 |
| 2021/0405760 A1* | 12/2021 | Schoen | ................. | G06F 1/1686 |
| 2022/0086205 A1* | 3/2022 | LeBeau | ................. | G06F 3/0219 |
| 2022/0197277 A1* | 6/2022 | Cabibihan | ............ | G05D 1/0038 |

FOREIGN PATENT DOCUMENTS

| | | | | |
|---|---|---|---|---|
| CA | 2810307 A1 * | 3/2012 | ............ | A63F 13/00 |
| WO | WO-2022047436 A1 * | 3/2022 | ........... | G06F 3/0482 |

* cited by examiner

*Primary Examiner* — Daniel Rodriguez
(74) *Attorney, Agent, or Firm* — Polsinelli PC

(57) ABSTRACT

A selection interface and method for a user in a virtual reality environment to select a software application for launch or a virtual reality system setting for activation by directly touching and interacting with an application or setting icon displayed to the user.

20 Claims, 1 Drawing Sheet

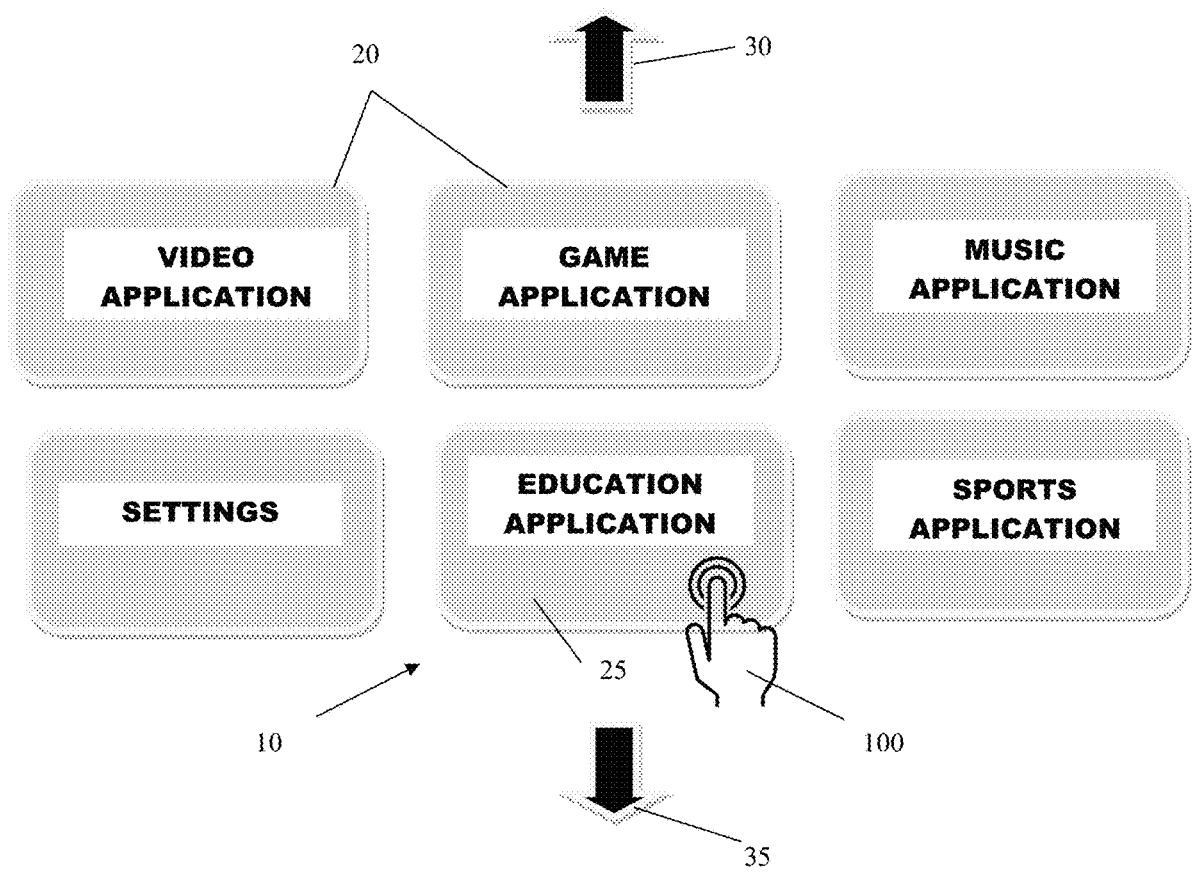

HAND CONTROL INTERFACES AND METHODS IN VIRTUAL REALITY ENVIRONMENTS

BACKGROUND OF THE INVENTION

Virtual reality (VR) environments have grown more realistic and immersive as VR headsets, controllers, interfaces, processor speeds, data storage and data transfer technologies have continued to improve. In electronic VR environments, such as implemented through development tools for the Oculus/Meta Quest platform (Oculus Platform SDK) by Oculus VR (Irvine, Calif.) (parent company Meta) there are both challenges and opportunities for customizing how users interact with the VR environment depending on whether the user is operating a physical controller device or using their body, typically their hands.

In conventional VR systems, such as the Meta Quest 2 platform, users can use either a physical controller or their hands to select and activate applications that are typically displayed 2-dimensionally in an application selection interface. In such conventional VR systems, when the user is using a physical controller they move the controller or use buttons, joystick, scrolling or similar input controls on the controller to select and launch an application from an application selection interface in which applications are displayed similar to application icons on mobile operating systems on tablets and phones, e.g. Android and Apple iOS. If a user is using their hands to interact with the application interface in the conventional VR environment, whether by initially using their hands or setting down the physical controller to switch to hands, the VR application selection interface remains the same; however, the user can make a pinch or similar pointing gesture to simulate laser pointing from the fingertips of the hand recognized by the system for selecting an application for launch from the display of the plurality of application icons in the VR application selection interface.

One of the deficiencies of the VR application selection interface remaining in the same display format between a user's use of a physical controller and hands is that the current "laser pointing" hands experience is that the laser pointing effect can be slow to be recognized or not even recognized, difficult to quickly and accurately choose an application for launch, and be less intuitive for moving between application selection and applications selection screens as compared to use of the physical controller for which the application selection interface is more compatible.

SUMMARY OF THE INVENTION

Embodiments of the invention address these challenges by providing methods and systems with improved display and functionality of an application selection interface in a VR environment that changes specifically for use with a user's hands (or other body parts, e.g. arms, feet, etc.) as compared to a separate and different application selection interface that is displayed when physical controllers are used. In embodiments, methods and systems of the invention are implemented through development tools for the Oculus/Meta Quest platform (Oculus Platform SDK) by Oculus VR (Irvine, Calif.) (parent company Meta). It will be appreciated that the systems and methods, including related displays, user interfaces, controls and functionalities, disclosed herein may be similarly implemented on other VR platforms with other VR SDKs and software development tools known to VR developers.

In an embodiment of the invention, a first application selection interface is provided in connection with use of a physical controller or controllers in a VR environment. The first selection interface may be the same or similar to conventional VR application selection interfaces, such as implemented in the Meta Quest 2 VR system. When a user initially does not use or switches away from using a physical controller, to use a user's hands in the VR environment, a second application selection interface that is better and more intuitively adapted for hand interaction and control is displayed to the user.

In further embodiments, a second and different application selection interface for use with a user's hands in a VR environment (as compared to a first application selection interface for use with a physical controller) does not require laser pointing functionality of conventional VR platforms, but may be presented to appear to be directly acted upon by the user hands, such as pushing or pulling the selected application with a hand to launch the application.

In embodiments, application icons in the application selection interface used with hands control may be presented as three-dimensional buttons that a user may use their hands to press the "application button" to launch a desired application. In other embodiments application icons may be presented a three-dimensional levers or switches that can be pulled or flipped to launch the desired application.

In further embodiments, scrolling arrows may also be presented as three-dimensional buttons to a user for navigating the application selection interface by scrolling up and down by selecting the corresponding up or down button, such as by pushing or pulling the scrolling arrow button. It will be appreciated that the application icons in the application selection interface will scroll up or down based on selection of an up or down scrolling arrow.

In further embodiments, an application selection interface specific for hands control in a VR environment is displayed to appear at a different distance from the user in comparison to the application selection interface displayed for use with a physical controller. For example, a VR platform may calculate, either directly or indirectly based on arm length, relative arm length, user height, relative user height, or from average user arm lengths or height, a preferred distance that VR application selection interface appears closer to the user than an application selection interface displayed when the user is using a physical controller. In one embodiment, such distance for a hands-controlled application selection interface may be about half of an arm length (or relative or average determined arm length) for a user. It will be appreciated that in other embodiments, other distances from the user to the hands-controlled application display interface may be implemented for display, including user-selected distances.

In embodiments of the invention, an improved hands-control specific interface may be implemented through (i) a software application running on the VR platform operating system, (ii) programming of the hands-control interface as a feature in the VR platform operating system and (iii) other programmed plug-ins and similar control modifications adapted for use in the VR platform operating system. It will be appreciated that Oculus/Meta Quest system software based on Android source code provides one example of a VR platform operating system.

BRIEF DESCRIPTION OF THE DRAWINGS

FIG. 1 is a perspective view of virtual reality application selection interface for control by a user's hands that interact with application icons and scrolling arrows to press and select an application for launch in an embodiment of the invention.

DETAILED DESCRIPTION

The present invention is directed to methods and interfaces for application selection in virtual reality environments, such as the Meta Quest 2 platform (Irvine, Calif.).

Typically, a user in a virtual reality platform wears a headset paired with controllers, such as "touch" controllers, wherein the user interacts with their environment via the tracking and inputs received from one or both controllers to the computerized headset running system or operating software. It will be appreciated that such interaction via controllers includes selection of application icons from an application selection interface when the user desires to launch and activate a desired application appearing in the selection interface.

A conventional alternative way for users to interact with a virtual reality environment in the Meta Quest 2 platform, includes hand tracking. Hand tracking may be activated when a user puts down physical device controllers or is not using the device controllers when beginning interaction in the VR environment. Hand tracking works by using the inside-out cameras of the VR headset which detects the position and orientation of the user's hands and the configuration of the user's fingers. Once detected, computer vision algorithms track the movement and orientation of the user's hands. Conventionally, the computer vision then recognizes pinching and scrolling gestures from a user's hands that appear and operate like "laser hands" for the user to select, scroll and provide control inputs and interact with the virtual reality environment according to the operating system software for the VR platform.

The hand tracking feature of the current Meta Quest 2 platform applied to application selection, such as a typical application selection interface resembling application icons on mobile devices and tablets (e.g. IOS and android application selection screens) but in a 3D virtual reality environment can be difficult for users to achieve proper pointing and recognition of the desired control input from the "laser hand" effect as compared to traditional procedures of tapping a button on an application selection interface of the mobile device and tablet platforms.

Referring to FIG. 1, an embodiment of the invention is illustrated wherein an alternative hand tracking and control interface for selection of an application icon 25 to launch and activate an application is provided in a VR environment to mimic the look and feel and of tapping or pressing a an application icon from an application selection interface of mobile device and tablet environments.

When a user puts down a VR physical device controller or is not using the VR physical device controller when beginning a VR platform experience, an application selection interface 10 includes a grid of icons of applications 20 displayed for a user's selection by a user's hand 100 that is tracked by the camera and computer vision of a VR headset worn by the user. It will be appreciated that in embodiments of the invention, a hands-control specific interface of the invention may be implemented through (i) a software application running on the VR platform operating system, (ii) programming of the hands-control interface as a feature in the VR platform operating system and (iii) other programmed plug-ins and similar control modifications adapted for use in the VR platform operating system. It will be appreciated that Oculus/Meta Quest system software based on Android source code provides one example of a VR platform operating system that may be modified to add or provide an alternative of the hands-control interface of the invention.

In a preferred embodiment, scroll buttons or representations are displayed as an up arrow 30 and a down arrow 35. The user's hands 100 can use a finger to push those buttons 30 and 35 to scroll among the application icons 20 of the application selection interface 10 to choose an application for launching. To the user the selection of desired application, such as education application icon 25, mimics pushing a button in the real world, including pushing a scroll button 30 and 35 or an application icon 25.

In some embodiments, if the users returns to use of a physical controller, the scroll buttons up 30 and down 35 may be programmed to disappear as push buttons since the button pushing experience would no longer be relevant.

Unlike the pinching of fingers to provide a laser-pointing experience in prior art hands tracking of the Meta Quest 2 platform, a user of the present invention for hands control with an application selection interface simply moves their hand 100 and finger over a desired application icon 25 among a plurality of application icons 20 displayed in the application selection interface 10, and simply pushes the desired application icon 25 as a button to launch the application. The camera tracking and computer vision algorithm in the VR platform activates the "pressed" application when detected. To the user, the experience is more similar to pressing application icons in a mobile device or table environment.

In embodiments of the invention, the application icons 20 could be represented as 2-dimensional (2D) application icons that become 3D buttons. When a user is in the hands-control interface of the present invention, the application icons 20 can lift up from 2D display to being displayed as a 3D button, so that it is clear to a user that they can push the application icon 20 as a button down with the user's finger on the user's hand 100.

In some embodiments, a user does not need to set down controllers or gesture to activate the hands-control and application selection interface of the invention, but could choose from a settings display, such as at the bottom of the user's VR environment display and select activation of the desired hands-control feature.

In further embodiments, a user could select menus and settings features that are not necessarily applications in a similar manner of hands-control selecting an icon representing a menu item or setting. For example, a Wi-Fi settings button might change from a 2D to 3D display, so a user knows that the setting can be activated as pressed from the user's hands 100 instead of physical device controllers.

In some embodiments, pulling and sliding actions from a user's hand 100 might be implemented in the VR platform instead of button pressing depending on the desired action of the user. For example, a user could grab an application icon 20 or between application icons and move the user's hand up or down to cause the application grid to scroll up or down respectively. That is, the user user's their hand 100 to grab something that is displayed to the user and move it up or down, like how someone might grab a huge classroom chalkboard or window to slide it up or down in the real world.

In further embodiments of the invention, when a user is in the hands-control interface for application selection, the interface applications grid and settings button appears to move toward the user after calculating about how long the user's arms are—such as (i) based on average American height or; (ii) based on how far away physical controllers were when dangling at the user's side or; (iii) based on a user's height since that dimension can be used determine arm length. It will be appreciated that other methods for calculating a preferred distance for an application selection interface 10 to be displayed relative to the user hands 100 may be utilized, with the intention that the user perceives an ability to reach and press or grab or otherwise interact with the application icons 20 or similar menus and settings feature and buttons as an alternative to controller operation and laser-hands interaction.

Various embodiments of the invention have been described. It will, however, be evident that various modifications and changes may be made thereto, and additional embodiments may be implemented, without departing from the broader scope of the invention as set forth by the claims. This specification is to be regarded in an illustrative rather than a restrictive sense.

What is claimed is:

1. An application selection interface comprising:
   a first grouping of a plurality of software application icons displayed in a virtual reality environment to a user using a virtual reality hardware device, wherein the first grouping appears closer to a body part of the user that is tracked by a camera of the virtual hardware device to interact with the first grouping than another second grouping of software application icons that is displayed to the user when the user is using a physical controller in the virtual reality environment; and
   at least one software application icon of the first grouping of the plurality of software icons operatively linked to launch a respective software application when interacted with by a pushing, pulling, tapping, pressing or sliding action of the body part of the user directly on the application icon.

2. The application selection interface of claim 1, wherein the at least one software application icon is displayed as 3-dimensional button that launches a respective software application when pressed by the user's hand or finger.

3. The application selection interface of claim 2, further comprising up and down arrows displayed as buttons adjacent the plurality of software application icons, wherein the up and down arrows are operatively linked to scrolling the plurality of software application icons when directly interacted with by a user's hand or finger.

4. The application selection interface of claim 1, further comprising up and down arrows displayed as buttons adjacent the plurality of software application icons, wherein the up and down arrows are operatively linked to scrolling the plurality of software application icons when directly interacted with by a user's hand or finger.

5. The application selection interface of claim 4, wherein the plurality of software application icons are displayed within an apparent distance of a user's arm length to the user.

6. The application selection interface of claim 1, wherein the plurality of software application icons are displayed within an apparent distance of a user's arm length to the user.

7. The application selection interface of claim 2, wherein the plurality of software application icons are displayed within an apparent distance of a user's arm length to the user.

8. An application selection interface comprising:
   a first grouping of a plurality of icons each representing at least one of a software application and a virtual reality platform system setting displayed in a virtual reality environment to a user using a virtual reality hardware device, wherein the first grouping appears closer to a body part of the user that is tracked by a camera of the virtual hardware device to interact with the first grouping than another second grouping of software application and setting icons that is displayed to the user when the user is using a physical controller in the virtual reality environment;
   a first icon of the first grouping of the plurality of icons representing a virtual reality platform system setting operatively linked to activate a setting when interacted with by a pushing, pulling, tapping, pressing or sliding action of the body part of the user directly on the first icon; and
   a second icon of the first grouping of the plurality of icons representing a software application operatively linked to launch a software application when interacted with by a pushing, pulling, tapping, pressing or sliding action of the body part of the user directly on the second icon.

9. The application selection interface of claim 8, wherein the first icon is displayed as a 3-dimensional button that activates a virtual reality platform system setting when pressed by the user's hand or finger and the second icon is displayed as a 3-dimensional button that launches a software application when pressed by the user's hand or finger.

10. The application selection interface of claim 9, wherein the first grouping of the plurality of icons are displayed within an apparent distance of a user's arm length to the user.

11. The application selection interface of claim 8, wherein the first grouping of the plurality of icons are displayed within an apparent distance of a user's arm length to the user.

12. A method for providing an interactive control interface in a virtual reality environment comprising:
   detecting that a user using a virtual reality environment via a virtual reality hardware device is not using or has discontinued use of a physical device controller used to interact with the virtual reality environment;
   displaying to the user a first grouping of a plurality of icons each representing at least one of a software application and a virtual reality platform system setting after said detecting, wherein the first grouping is displayed to appear closer to a body part of the user that is tracked by a camera to interact with the first grouping than another second grouping of software application and setting icons displayed to the user when the user was using the physical device controller in the virtual reality environment;
   receiving a control input selecting a chosen icon of the first grouping from the user that appears as a direct touching body interaction from the user to the icon;
   launching, in response to receiving the control input, a respective software application that is linked to the chosen icon if the icon represents a software application; and
   activating, in response to receiving the control input, a virtual reality platform system setting that is linked to the chosen icon if the icon represents a virtual reality platform system setting.

13. The method of claim 12, wherein the chosen icon of the first grouping is displayed as a 3-dimensional button that (i) activates a virtual reality platform system setting when pressed by the user's hand or finger if the chosen icon represents a virtual reality platform system setting and (ii) launches a software application when pressed by the user's hand or finger if the chosen icon represents a software application.

14. The method of claim 13, further comprising up and down arrows displayed as buttons adjacent the first grouping of the plurality of icons, wherein the up and down arrows are operatively linked to scrolling the plurality of icons when directly interacted with by a user's hand or finger.

15. The method of claim 14, further comprising determining an apparent distance relative to the user that the first grouping of the plurality of icons should be displayed to be within a touching distance of the user.

16. The method of claim 15, wherein the apparent distance is determined based on an arm's length of a user.

17. The method of claim 15, wherein the apparent distance is determined based on a height of the user.

18. The method of claim 15, wherein the apparent distance is determined based on a predetermined value representing average arms' length for a predetermined group of persons.

19. The method of claim 12, further comprising determining an apparent distance relative to the user that the first grouping of the plurality of icons should be displayed to be within a touching distance of the user.

20. The method of claim 13, further comprising determining an apparent distance relative to the user that the first grouping of the plurality of icons should be displayed to be within a touching distance of the user.

\* \* \* \* \*

UNITED STATES PATENT AND TRADEMARK OFFICE
CERTIFICATE OF CORRECTION

PATENT NO. : 11,531,448 B1
APPLICATION NO. : 17/830109
DATED : December 20, 2022
INVENTOR(S) : Ethan Fieldman Page 1 of 1

It is certified that error appears in the above-identified patent and that said Letters Patent is hereby corrected as shown below:

In the Claims

Claim 1, Column 5, Line 25, "virtual hardware device" should read --virtual reality hardware device--.

Claim 1, Column 5, Line 31, "software icons" should read --software application icons--.

Claim 1, Column 5, Line 35, "the application icon" should read --the at least one software application icon--.

Claim 8, Column 6, Line 1, "virtual hardware device" should read --virtual reality hardware device--.

Signed and Sealed this
Sixteenth Day of December, 2025

John A. Squires
*Director of the United States Patent and Trademark Office*